United States Patent
Tillaart et al.

[11] Patent Number: 6,001,318
[45] Date of Patent: Dec. 14, 1999

[54] PROCESS FOR LOWERING NITROGEN OXIDE LEVELS IN COMBUSTION ENGINE EXHAUST GAS

[75] Inventors: Hans Van Den Tillaart, Freigericht; Jürgen Leyrer, Rheinfelden; Egbert Lox, Hanau; Thomas Kreuzer, Karben; Stephan Eckhoff, Wunstorf, all of Germany

[73] Assignee: Degussa-Hüls Aktiengesellschaft, Frankfurt am Main, Germany

[21] Appl. No.: 08/996,215

[22] Filed: Dec. 22, 1997

[30] Foreign Application Priority Data

Dec. 21, 1996 [DE] Germany .......................... 196 53 958

[51] Int. Cl.$^6$ .............................. B01D 47/00; B01J 8/00; F01N 3/00; F01N 3/10
[52] U.S. Cl. ............... 423/212; 423/239.1; 423/213.2; 423/213.5; 60/274; 60/286; 60/301
[58] Field of Search .............................. 60/274, 285, 286, 60/299; 423/235, 212, 239.1, 213.5, 213.2

[56] References Cited

U.S. PATENT DOCUMENTS

| | | | |
|---|---|---|---|
| 3,747,346 | 7/1973 | Onoda et al. ............................ | 60/286 |
| 3,947,544 | 3/1976 | Yamada et al. ......................... | 423/212 |
| 5,174,111 | 12/1992 | Nomura et al. ......................... | 60/285 |
| 5,357,749 | 10/1994 | Ohsuga et al. .......................... | 60/274 |
| 5,404,719 | 4/1995 | Araki et al. ............................. | 60/276 |
| 5,517,848 | 5/1996 | Hosoya et al. .......................... | 73/23.31 |
| 5,645,804 | 7/1997 | Sumiya et al. ...................... | 423/239.1 |

FOREIGN PATENT DOCUMENTS

| | | |
|---|---|---|
| 0 559 021 | 9/1993 | European Pat. Off. . |
| 2 046 180 | 6/1971 | Germany . |
| 42 15 942 | 12/1992 | Germany . |

*Primary Examiner*—Wayne Langel
*Assistant Examiner*—Maribel Medina-Sanabria
*Attorney, Agent, or Firm*—Smith, Gambrell & Russell, LLP

[57] ABSTRACT

A process is disclosed for lowering nitrogen oxide levels in combustion engine exhaust gas by a reduction catalyst and by controlling the exhaust gas temperature upstream from the catalyst to a constant value, at which the catalyst exhibits maximum conversion for nitrogen oxides. It is possible to maintain maximum conversion over a wide range of engine outlet temperatures of the exhaust gas.

11 Claims, 3 Drawing Sheets

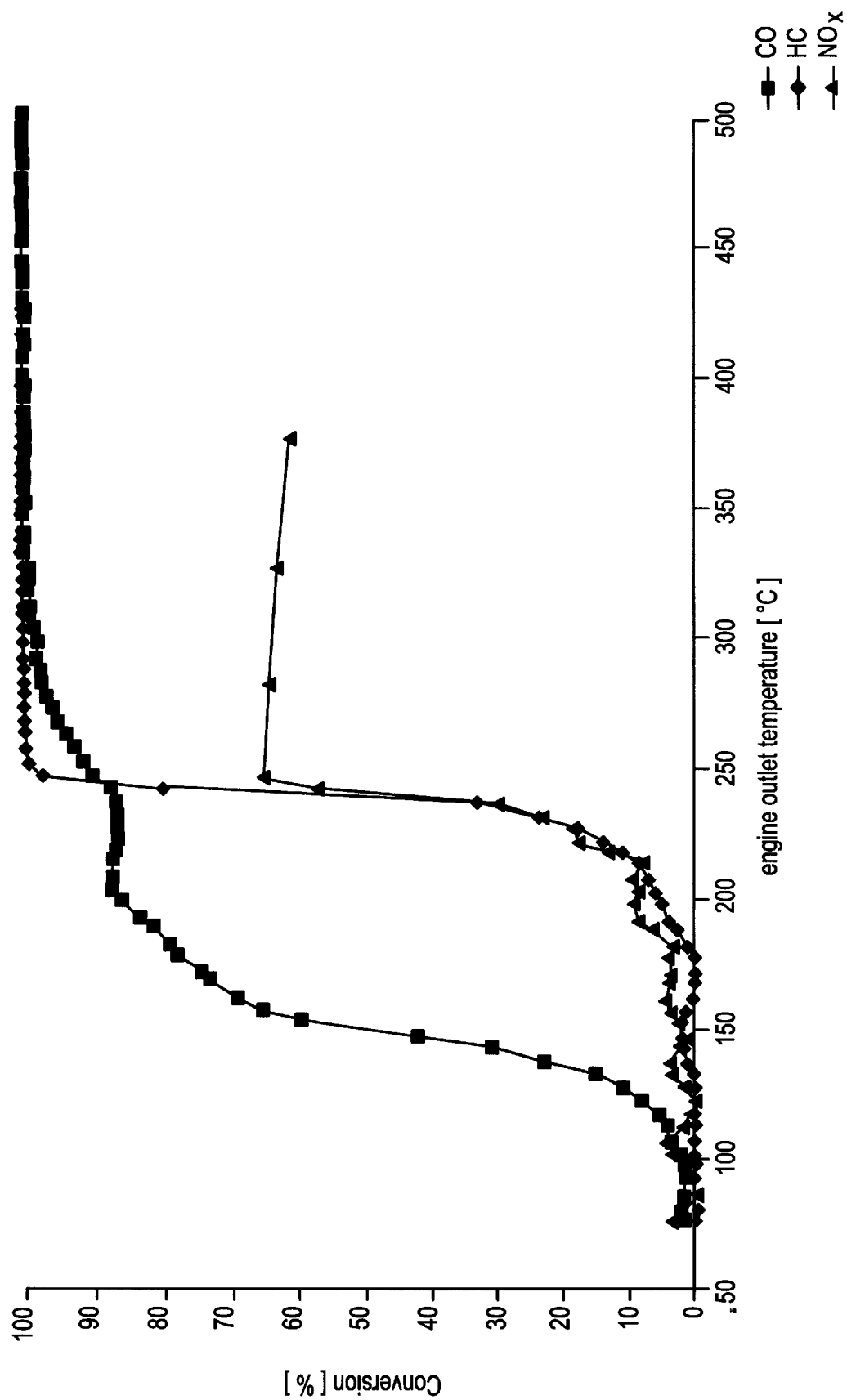

PROCESS FOR LOWERING NITROGEN OXIDE LEVELS IN COMBUSTION ENGINE EXHAUST GAS

INTRODUCTION AND BACKGROUND

The present invention relates to a process for lowering nitrogen oxide levels in combustion engine exhaust gas by catalytic reduction on a reduction catalyst using the hydrocarbons and carbon monoxide also present in the exhaust gas as reducing agents to yield nitrogen, water and carbon dioxide.

During normal operation, the exhaust gas from diesel engines and Otto cycle engines operated with a lean mixture (known as lean-burn engines) contains a high proportion of 3 to 10 vol. % of oxygen in addition to uncombusted hydrocarbons, carbon monoxide and nitrogen oxides. Due to the super stoichiometric oxygen content of the exhaust gas, it is not possible to convert all three pollutants simultaneously using the three-way method conventional for Otto cycle engines. Otto cycle engines, also known as gasoline internal combustion engine, are usually operated with air ratios, $\lambda$, of around 1, while diesel engines and lean-burn engines work at air ratios of approximately 1.2 and above. The air ratio, $\lambda$, is the air/fuel ratio standardized for stoichiometric operation (kilogram air/kilogram fuel).

The uncombusted hydrocarbons and carbon monoxide in diesel exhaust and the exhaust from lean-burn engines may relatively readily be converted by oxidation catalysts. In contrast, special reduction catalysts must be used to convert the nitrogen oxides. Such catalysts are described, for example, in "Design Aspects of Lean $NO_x$-Catalysts for Gasoline and Diesel Engine Applications" by Leyrer et al. in SAE-Paper no. 95 2485, 1995 and in "Catalytic reduction of $NO_x$ with hydrocarbons under lean diesel exhaust gas conditions" by Engler et al. in SAE-Paper no. 930735, 1993. Zeolite-based catalysts, which may be exchanged with various catalytically active metals (for example copper or platinum), are used.

These so-called DENOX catalysts reduce the nitrogen oxides while simultaneously oxidizing hydrocarbons and carbon monoxide. The conversion rates for the individual pollutant components are highly dependent upon exhaust gas temperature. As exhaust gas temperature rises, oxidation of the hydrocarbon and carbon monoxide begins first and, within a temperature range from 150 to 175° C., reaches oxidation rates of above 90%. As temperature rises further, hydrocarbon conversion remains constant. The exhaust gas temperature at which a conversion rate of 50% is achieved for a particular pollutant is known as the light off temperature for this pollutant.

The conversion rate for nitrogen oxides follows the hydrocarbon conversion rate. However, it does not rise uniformly, instead passing through a maximum at temperatures at which hydrocarbon oxidation has virtually achieved its maximum value and then falling back virtually to zero as temperature increases further. Optimum conversion rates for nitrogen oxides are thus achieved only within a narrow temperature window.

The conversion curves for the individual pollutants are highly dependent upon the formulation of the particular catalyst. This also applies to nitrogen oxides: the position and size of the temperature window and the maximum conversion rate achievable within this window are dependent upon the catalyst formulation. So-called low-temperature catalysts are known which achieve maximum nitrogen oxide conversion at temperatures of between 200 and 250° C. In the case of high-temperature catalysts, maximum nitrogen oxide conversion is above 300° C.

The great temperature dependence of nitrogen oxide conversion rates is a major problem for the purification of diesel exhaust gases as the engine outlet temperature of the exhaust gases in operating diesel vehicles may vary between approximately 150 and 500° C. depending upon driving conditions. Elevated conversion rates are thus achieved only during short phases of operation during which the exhaust gas temperature is within the optimum range for the catalyst used.

A further problem in this connection is also the trend in modern catalyst development to develop catalysts with ever lower light off temperatures. In these catalysts, the window for maximum conversion of nitrogen oxides is, of course, also shifted towards lower temperatures, such that virtually no nitrogen oxides are converted at higher exhaust gas temperatures.

In order to ensure nitrogen oxide conversion over a wider temperature range, it has already been attempted to combine low-temperature and high-temperature catalysts or to inject additional hydrocarbons as a reducing agent into the exhaust gas stream shortly upstream from the catalyst.

An object of the present invention is to avoid the shortcomings and drawbacks of prior known methods of exhaust gas purification.

A further object of the present invention is to attain elevated conversion of the nitrogen oxides even at temperatures above the maximum nitrogen oxide conversion of the catalyst used.

SUMMARY OF THE INVENTION

The above and other objects of the invention are achieved by a process wherein the temperature of the exhaust gas upstream from the reduction catalyst is controlled to a value at which the nitrogen oxide conversion rate is at its maximum.

Thus, it is a feature of the invention to lower nitrogen oxide levels in combustion engine exhaust gas using a reduction catalyst and controlling the exhaust gas temperature upstream from the catalyst to a constant value, at which the catalyst exhibits maximum conversion for nitrogen oxides. By operating the process in this way it is possible to maintain maximum conversion of the nitrogen oxide over a wide range of engine outlet temperatures of the exhaust gas.

The effectiveness of a DENOX catalyst is thus improved according to the invention by the exhaust gas always being cooled before entry into the catalyst to the temperature at which the catalyst used exhibits its maximum conversion for nitrogen oxides.

BRIEF DESCRIPTION OF DRAWINGS

The present invention will be further understood with reference to the drawings, wherein:

FIG. 3 is a graph containing a plot of carbon monoxide, hydrocarbon and nitrogen oxide conversion rates as a function of engine outlet temperature of the diesel exhaust in the case of operation of the exhaust gas purification system using the process according to the invention.

DETAILED DESCRIPTION OF THE INVENTION

Figure 1:
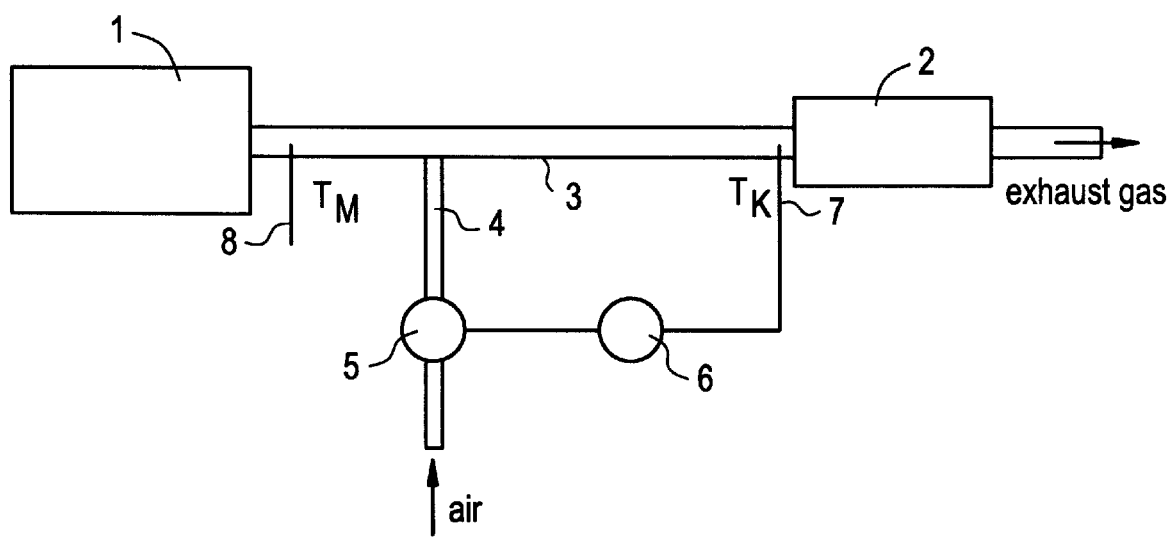
FIG. 1 is a schematic flow diagram of an exhaust gas purification system for performance of the process according to the invention.

The exhaust gas cooling according to the invention may be achieved in various ways. It is possible to pass the exhaust gas through a controlled heat exchanger upstream from the catalyst, which exchanger either transfers the excess heat from the exhaust to the engine coolant circuit or releases it directly into the ambient air. If a motor vehicle is being operated with the engine, the heat exchanger may also use the excess heat to heat the circulating air for the vehicle interior. The heat exchanger is built into the exhaust pipe between the engine and the reduction catalyst.

Exhaust gas cooling is preferably achieved by injecting cold ambient air into the exhaust gas stream between the engine and the catalyst, wherein the exhaust gas temperature is controlled by means of a temperature measurement upstream from the catalyst inlet.

By means of the present invention, it is possible constantly to maintain the exhaust gas temperature upstream from the catalyst within the optimum operating range, even if the engine outlet temperature of the exhaust gas is substantially higher. Optimum conversion rates for the nitrogen oxides may accordingly be maintained over a wide range of engine outlet temperatures for the exhaust gas. Carbon monoxide and hydrocarbon conversion rates are unaffected by this process.

Elevated exhaust gas temperatures entail the injection of large quantities of air into the exhaust gas stream in order to keep the catalyst temperature constant. However, the consequently increased volumetric flow rate and the reduced residence time of the pollutant components in the exhaust gas have hardly any negative effect on conversion rates: the light off temperatures for the hydrocarbons fall as the quantity of injected air increases. Nitrogen oxide conversion, however, remains approximately constant. The reasons for this reside in the increasing oxygen concentration and falling concentration of nitrogen oxides and water in the exhaust gas. Oxygen has a positive effect to a certain extent and increasing concentrations of nitrogen oxide and water have a negative effect on the light off behavior of the hydrocarbons. Furthermore, a light off temperature shifted towards lower temperatures usually brings about a higher maximum nitrogen conversion.

Another advantage of a constantly low catalyst temperature is that the catalyst is not exposed to ageing by sintering, such that its elevated initial activity may be maintained over an extended period of time. This fact should make it possible to use less temperature-resistant, but highly active catalysts which are rapidly deactivated at higher temperatures.

No particularly severe demands are placed upon the control system for secondary air injection as, due to the catalyst's elevated heat capacity in comparison with the gas phase, it reacts very slowly to temperature changes. Small temperature peaks or brief episodes of "overcooling" of the exhaust gas should thus have little lasting effect on conversion rates. Additional injection of fuel into the exhaust gas stream to bring about selective reduction of the nitrogen oxides may readily be combined with the secondary air injection. In urban traffic, the exhaust gas is relatively cold, such that virtually no exhaust gas cooling is required in this situation. On extended journeys, during which the exhaust gas has relatively high and constant temperatures, control is uncomplicated, but highly effective.

FIG. 1 shows an exhaust purification system for performing the process according to the invention. The exhaust gas originating from the engine 1 is released into the ambient air via a reduction catalyst 2. A fresh air inlet 4 opens into the exhaust pipe 3. The fresh air is injected into the exhaust gas by an air pump 5. The air pump is controlled by a controller 6 in such a manner that the exhaust gas temperature $T_K$ measured with a thermocouple 7 shortly upstream from the catalyst 2 is maintained at a constant preset value. The engine outlet temperature $T_M$ of the exhaust gas may be measured with the thermocouple 8. Without additional air injection, $T_K$ is only slightly lower than $T_M$. For each reduction catalyst selected for use in the system of the invention, the maximum conversion temperature conditions will be determined as show below.

COMPARATIVE EXAMPLE

The conversion rates of a $Pt/Al_2O_3$—$SiO_2$ catalyst containing 1.77 g of Pt/l of catalyst volume were measured as a function of the simulated engine outlet temperature $T_M$ on a synthesis gas plant. Table 1 shows the composition of the exhaust gas. This composition corresponds to an air ratio $\lambda$ of 1.345.

Figure 2:
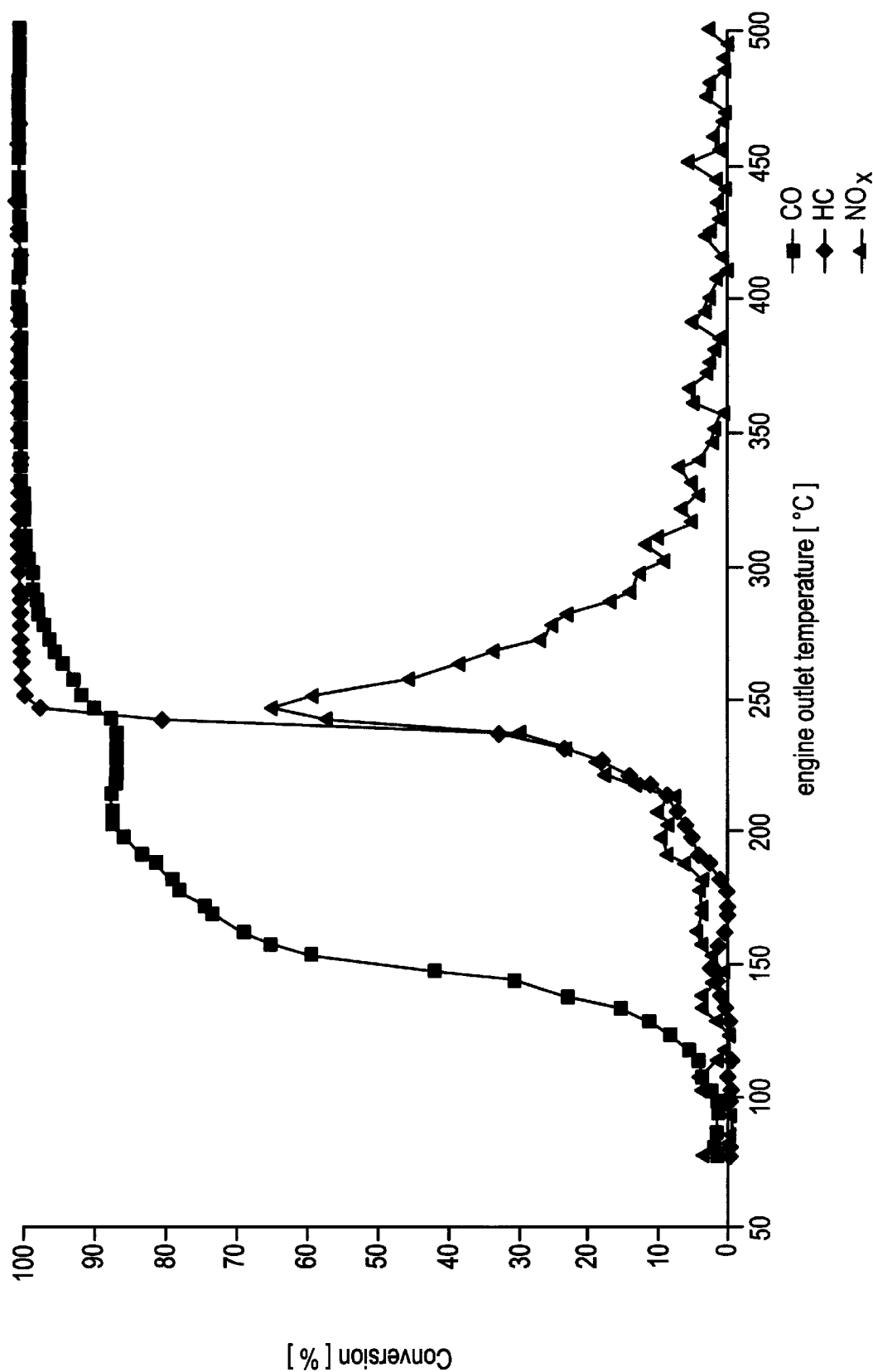
FIG. 2 is a graph containing a plot of carbon monoxide, hydrocarbon and nitrogen oxide conversion rates as a function of engine outlet temperature of the diesel exhaust in the case of conventional operation of the exhaust gas purification system.

The above catalyst was of a diameter of 2.54 cm and a length of 7.5 cm. The exhaust gas was passed over this catalyst at a space velocity of 50000 $h^{-1}$. The simulated engine outlet temperature $T_M$ was raised from 75 to 500° C. at a rate of 15° C./min while the exhaust gas was passed over the catalyst. The conversion rates measured during the heating phase for the individual pollutants are plotted against engine outlet temperature in FIG. 2.

The light off temperature for carbon monoxide is 150° C., that for hydrocarbons 240° C. The window for nitrogen oxide conversion is between 225 and 275° C. with a maximum of 64% at 245° C.

TABLE 1

Exhaust gas composition

| Component | Concentration (vol. %) |
|---|---|
| CO | 0.035 |
| HC | 0.240 |
| NO | 0.027 |
| $H_2$ | 0.012 |
| $CO_2$ | 10.700 |
| $O_2$ | 6.000 |
| $H_2O$ | 10.000 |
| $SO_2$ | 0.002 |
| $N_2$ | 72.984 |

$\mu = 1.345$

EXAMPLE

The measurements of the Comparative Example were repeated, but in this case, once an engine outlet temperature $T_M$ of 245° C. had been reached, the exhaust gas temperature upstream from the catalyst $T_K$ was held constant at this value by injecting air. The air used for diluting and cooling the exhaust gas had a temperature of 0° C. The conversion rates measured during the heating phase for the individual pollutants are plotted against engine outlet temperature in FIG. 3.

Table 2 shows the quantity of dilution air in volume percent relative to the exhaust gas stream required for the particular engine outlet temperature in order to reduce the exhaust gas temperature upstream from the catalyst $T_K$ to 245° C. The oxygen content of the diluted exhaust gas and the achieved nitrogen oxide conversion rates are also shown.

TABLE 2

| Engine outlet temperature $T_M$ [°] | Catalyst inlet temperature $T_K$ [°] | Quantity of air [vol. %] | Oxygen content [vol. %] | $NO_x$ conversion [%] |
|---|---|---|---|---|
| 75  | 75  | 0  | 6    |      |
| 245 | 245 | 0  | 6    | 64   |
| 282 | 245 | 20 | 8.4  | 63.6 |
| 325 | 245 | 40 | 10.1 | 62.6 |
| 376 | 245 | 60 | 11.4 | 60.5 |

By means of the exhaust gas purification process according to the invention, it is thus possible with the catalyst used to achieve a degree of nitrogen oxide conversion of 60%, which is only slightly below the maximum degree of conversion of 64%, even at engine outlet temperatures of 376° C. It should be noted that comparable results are to be expected utilizing other suitable reduction catalysts that are able to convert nitrogen oxide into nitrogen. Without exhaust gas cooling, the degree of conversion at an engine outlet temperature of 376° C. would be below 1%.

Further variations and modifications of the foregoing will be apparent to those skilled in the art and are intended to be encompassed by the claims appended hereto.

We claim:

1. A process for lowering levels of nitrogen oxides in the exhaust gas stream of lean burn combustion engines comprising catalytically reducing said nitrogen oxides in the presence of a reduction catalyst which reduces nitrogen oxides to nitrogen, using the hydrocarbons and carbon monoxide also present in the exhaust gas as reducing agents, measuring exhaust gas temperature at a point in said stream upstream from said catalyst, and upstream from said point injecting fresh air into the exhaust gas stream to control the temperature of the exhaust gas upstream from the reduction catalyst to a value at which the conversion rate for the nitrogen oxides into nitrogen as the exhaust gas passes in contact with said reduction catalyst is at its maximum to thereby yield nitrogen, water and carbon dioxide in the exhaust gas.

2. The process according to claim 1 wherein as a preliminary step, determining the maximum conversion rate for nitrogen oxide into nitrogen for said reduction catalyst.

3. The process according to claim 1, further comprising mixing additional reducing agents in gaseous or vapor form into the fresh air.

4. The process according to claim 1 wherein the reduction catalyst is a DENOX catalyst.

5. The process according to claim 1 further comprising:

measuring the temperature of the exhaust gas upstream from the reduction catalyst.

6. The process according to claim 1 wherein the air fuel ratio is approximately 1.2 and above.

7. The process according to claim 1 wherein the exhaust gas is cooled before entry into the reduction catalyst to a temperature at which said catalyst exhibits its maximum conversion for nitrogen oxides.

8. A process for improving conversion of nitrogen oxides in an exhaust gas stream of a lean burn combustion engine into harmless components by catalytic reduction on a reduction catalyst which reduces nitrogen oxides to nitrogen comprising passing said exhaust gas in contact with said reduction catalyst capable of reducing nitrogen oxides into nitrogen, measuring the temperature of said exhaust gas upstream from the reduction catalyst, and controlling the temperature of said exhaust gas upstream from said reduction catalyst based on said measuring by injecting air into the exhaust gas stream, to thereby bring the temperature of said exhaust gas to a value at which the conversion rate for the nitrogen oxides into harmless components is at its maximum, as previously determined for said reduction catalyst.

9. The process according to claim 8 further comprising using the hydrocarbons and carbon monoxide also present in the exhaust gas as reducing agents to yield nitrogen, water and carbon dioxide.

10. The process according to claim 8, wherein the exhaust gas temperature is cooled to the temperature at which the conversion rate is at a maximum.

11. The process according to claim 8 wherein the reduction catalyst is a DENOX catalyst.

* * * * *